Patented Apr. 25, 1933

1,906,207

UNITED STATES PATENT OFFICE

KENNETH G. BLAIKIE AND GEORGE O. MORRISON, OF SHAWINIGAN FALLS, QUEBEC, CANADA, ASSIGNORS TO CANADIAN ELECTRO PRODUCTS COMPANY, LIMITED, OF MONTREAL, QUEBEC, CANADA

ESTER-ALDEHYDE GUM EMULSION AND PROCESS OF MAKING SAME

No Drawing.  Application filed March 25, 1929. Serial No. 349,895.

This invention relates broadly to improvements in gummy or resinous products made by reaction by vinyl esters and aldehydes, and relates more particularly to emulsions of these products and to the preparation thereof, and the object of the invention is to provide for the production of new and useful emulsified gums.

In prior applications, Serial Number 147,183, filed November 8th, 1926, and Serial Number 213,208, filed August 15th, 1927, there are disclosed processes of making gummy or resinous products by reaction of aliphatic vinyl esters and saturated aliphatic aldehydes, particularly vinyl acetate and acetaldehyde, in proportions varying from less than one part to more than one hundred parts of aldehyde to one hundred parts of ester, the products varying from solid to liquid according as a greater amount of aldehyde is used in the production of the same.

In the process of making the gummy or resinous product, the reaction mixture, after the reaction is complete is boiled with water to remove unreacted ester and aldehyde, and in this treatment the reaction product becomes emulsified with water and is softer than if there were no emulsification. For some of the uses to which the gums are put water emulsions are not satisfactory as they readily lose the water of emulsification and tend to become hard if exposed to the air for a period of time.

The present invention has to do with the formation of products using materials other than water to form such emulsions, and the products thereof. For the sake of clearness in the following specification, the water or other dispersed phase is called the dispersion medium, the gum being in all cases the continuous phase.

In carrying out the invention, vinyl ester-aldehyde gum emulsions are prepared using dispersion media other than water, for example, polyhydric alcohols, particularly those of the aliphatic series. The process consists generally in heating the gum with the dispersion medium, and emulsions are more readily produced if the dispersion medium has a certain degree of solvent action when hot, and of less solvent power when cold. Emulsions can, however, be obtained by maceration at room temperature.

The following examples will explain the manner of emulsifying, but it will be understood that the invention is not limited to the proportions, materials, temperature and modes of treatment.

Example I

Starting with a water emulsion of ester-aldehyde gum prepared by reacting 100 parts of vinyl acetate with approximately 12 parts of acetaldehyde, the emulsion being soft and plastic at ordinary room temperature but brittle below 15°–16° C., the emulsion is heated with 50% or more of its weight of ethylene glycol for about twenty minutes at about 130° C. Under these conditions, the gum goes completely into solution in the ethylene glycol and most of the water is removed. On cooling there separates an emulsion containing approximately 30% glycol. This emulsion is plastic and non-brittle at room temperature and is suitable for incorporation with other materials without imparting thereto the quality of brittleness.

The amount of ethylene glycol in the emulsion may be varied between 1% and over 30% of the dry weight of the gum by varying the proportions of gum and glycol and the temperature of treatment.

It will be noted in this example that at the temperature of emulsification all or most of the water of the original emulsion will be driven off and displaced. Obviously this procedure is substantially confined to use with dispersion media having higher boiling temperatures than water.

Example II

Proceeding as in Example I, butylene glycol, diethylene glycol, or propylene glycol is substituted. The results in either case are of the same character as obtained according to Example I.

Example III

The same procedure as outlined in Example I is followed except that the dispersion medium used consists of a mixture of 75% ethylene glycol and 25% glycerol. Similar results are obtained. It may be explained, however, that glycerol is not a dispersion medium of itself but when admixed with glycols or alcohols a certain proportion enters in the form of an emulsion. Glycerol, however, cannot be suitably used to an extent greater than 50% of the dispersion medium.

Ethyl alcohol, propyl alcohol, butyl alcohol, amyl alcohol, etc., will also form emulsions in a similar manner to that outlined, although in these cases it is preferable to macerate the dry gum with the alcohol although this may also be done by solution of the gum in the alcohol at its boiling point or below the same.

From the foregoing, it will be seen that emulsions may be prepared having characteristics different from the water emulsions; for instance, the ethylene, butylene and diethylene glycol emulsions are preferable to aqueous emulsions as substitutes for chicle in the manufacture of chewing gum. The glycol does not pass out of these emulsions in process of blending the same with the other chewing gum ingredients and the finished chewing gum remains plastic during long periods of storage, so that it does not crumble when mastication is commenced. When chewed, the gum softens with warmth and the dispersion medium being water-soluble slowly dissolves out of the gum and is replaced at the same rate by water, so that the consistency remains about constant. Obviously, in making emulsions for use in chewing gum manufacture, the dispersion medium, in addition to the afore-noted characteristics, must not have any undesirable physiological effect.

In the following claims, the expression "ester-aldehyde gum" is to be understood as limited to and indicating a gum produced from an aliphatic vinyl ester and a saturated aliphatic aldehyde.

Having thus described our invention, what we claim is:—

1. A process of making an emulsion of a vinyl ester-aldehyde gum, which comprises heating the gum with a polyhydric alcohol, and cooling the mixture and separating the resulting emulsion from excess of alcohol.

2. A process of making an emulsion of a vinyl ester-aldehyde gum, which comprises heating an aqueous emulsion of the gum with a polyhydric alcohol in which the gum is soluble when hot and which has a higher boiling temperature than water, the heating being at a temperature and for a time sufficient to drive off most of the water of the original emulsion, and cooling the solution and separating the resulting emulsion from excess of alcohol.

3. A process according to claim 1, in which the polyhydric alcohol is a glycol.

4. A process of making an emulsion of a vinyl acetate-acetaldehyde gum, which comprises heating the gum with a polyhydric alcohol in which the gum is soluble when hot and cooling the solution and separating the emulsion from excess of alcohol.

5. A process according to claim 4, in which the polyhydric alcohol is ethylene glycol.

6. A process of making a gummy product, which comprises reacting between 1 and 100 parts of acetaldehyde with 100 parts of vinyl acetate, separating the resulting gum from unreacted ester and aldehyde, and heating the resulting gum with a polyhydric alcohol, and separating the emulsion which results, on cooling, from the excess of alcohol.

7. A process of making a gummy product, which comprises reacting a saturated aliphatic aldehyde and an aliphatic vinyl ester and emulsifying the reaction product with an aliphatic polyhydric alcohol.

8. A gummy product being an emulsion of a vinyl ester-aldehyde gum and a polyhydric alcohol.

9. A gummy product being an emulsion of a vinyl ester-aldehyde gum and a water soluble dispersion medium being a polyhydric alcohol capable of being replaced by water thereby to produce an aqueous emulsion of practically the same consistency as the emulsion with said water soluble dispersion medium.

10. A gummy product being an emulsion of a vinyl ester-aldehyde gum and a polyhydric alcohol.

11. A gummy product being an emulsion with a polyhydric alcohol having a higher boiling temperature than water of a reaction product of an aliphatic vinyl ester and a saturated aliphatic aldehyde.

12. A gummy product being an emulsion with a polyhydric alcohol having a higher boiling temperature than water of a vinyl acetate-acetaldehyde reaction product.

13. A gummy product being a glycol emulsion of a reaction product of an aliphatic vinyl ester and a saturated aliphatic aldehyde.

14. A gummy product being a glycol emulsion of a reaction product of vinyl acetate and a saturated aliphatic aldehyde.

15. A gummy product being a glycol emulsion of a reaction product of an aliphatic vinyl ester and acetaldehyde.

16. A gummy product being a glycol emulsion of a reaction product of vinyl acetate and acetaldehyde.

17. A gummy product being an ethylene glycol emulsion of a reaction product of an aliphatic vinyl ester and a saturated aliphatic aldehyde.

18. A gummy product being an ethylene glycol emulsion of the reaction product of vinyl acetate and acetaldehyde.

19. A gummy product being the reaction product of vinyl acetate and acetaldehyde emulsified with a mixture of ethylene glycol and glycerol.

20. A process of making a gummy product which comprises reacting together an aliphatic vinyl ester and a saturated aliphatic aldehyde and emulsifying the resulting gum with an aliphatic polyhydric alcohol.

21. A gummy product being an emulsion in an aliphatic polyhydric alcohol of the reaction product of an aliphatic vinyl ester and a saturated aliphatic adelhyde.

In witness whereof, we have hereunto set our hands.

KENNETH G. BLAIKIE.
GEORGE O. MORRISON.